United States Patent Office

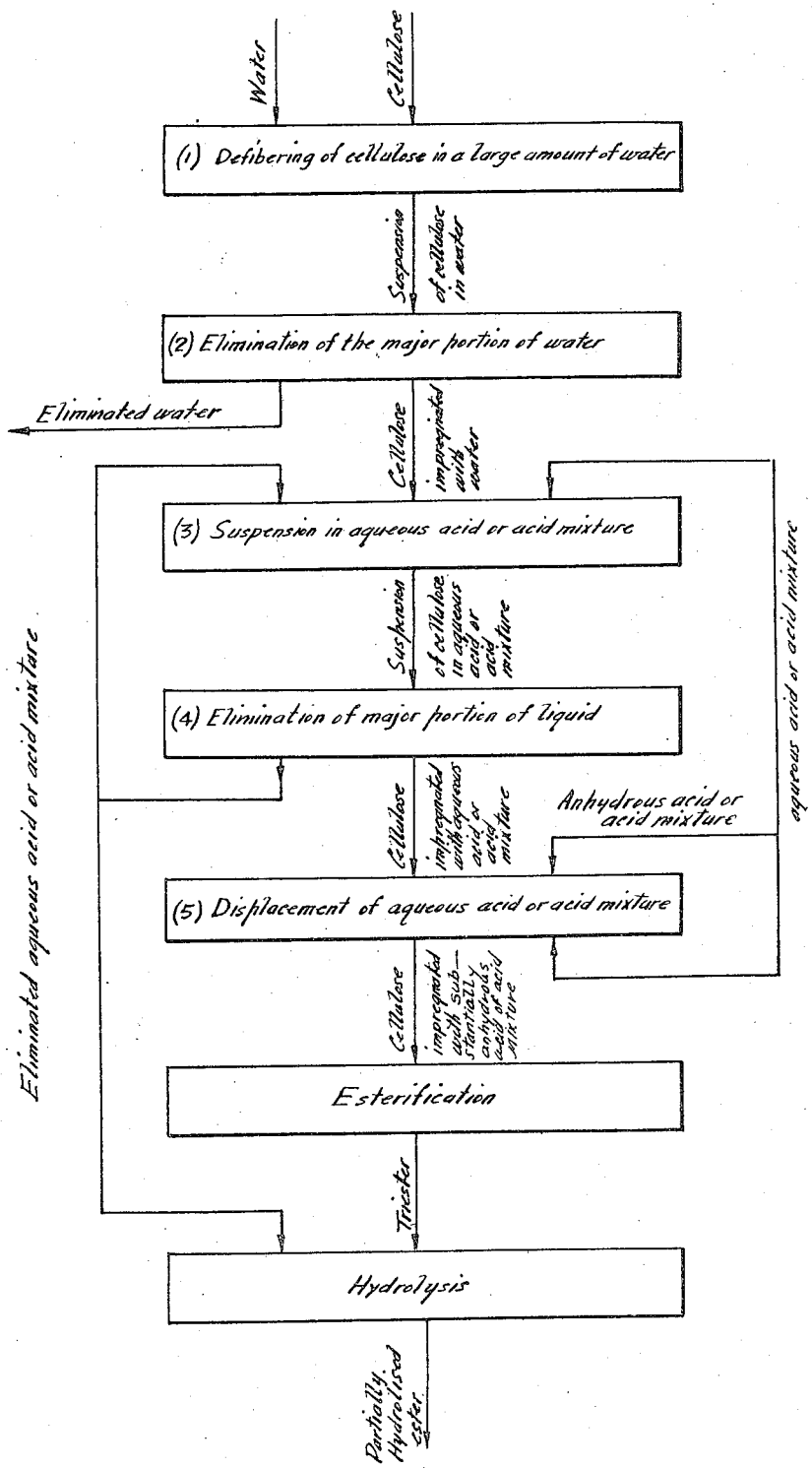

2,854,446
Patented Sept. 30, 1958

2,854,446

PROCESS FOR THE CONTINUOUS PRODUCTION OF CELLULOSE ESTERS

Jean Robin, Roussillon, and Roland Clevy, Le Peage-de-Roussillon, France, assignors to Societe Rhodiaceta, Paris, France, a body corporate of France Application November 8, 1956, Serial No. 621,070

Claims priority, application France October 29, 1952

6 Claims. (Cl. 260—229)

The present invention relates to a continuous process for the esterification of cellulose and is a continuation-in-part of our application Serial Number 342,214, now Patent No. 2,778,820.

It is an object of the present invention to provide a process for the continuous esterification of cellulose in which it is possible to reduce to the minimum the amount of lower carboxylic acid or a mixture thereof which is required for replacing the water with which the cellulose has to be impregnated.

It is a further object of the present invention to enable a reduction of the amount of water of impregnation which is left in the cellulose in the aforementioned process.

It is another object of the present invention to provide aqueous lower carboxylic acid or a mixture thereof engendered during the continuous esterification process which aqueous acid or acid mixture may be used for stopping the esterification.

It is another object of the present invention to provide aqueous lower carboxylic acid or a mixture thereof engendered during the continuous esterification process which aqueous acid or acid mixture may be used for hydrolysing the cellulose triester produced by the esterification.

It is another object of the present invention to enable one to dispense with the recovery of the aqueous lower carboxylic acid or a mixture thereof engendered during the above process, the said recovery being costly, laborious and time and space consuming.

Further objects of the present invention will become apparent hereinafter.

In accordance with the present invention a process for the continuous esterification of cellulose comprises the following features:

(a) Defibering cellulose in 15 to 30 times its dry weight of water;

(b) Removing water from the defibered cellulose until it is impregnated by an amount of water of from 0.6 to 2.5 times the dry weight of the cellulose;

(c) Suspending the resulting water impregnated cellulose in 30 to 200 times its dry weight of aqueous lower carboxylic acid, said aqueous lower carboxylic acid being a solvent for the cellulose ester being manufactured and having a concentration of from 50 to 80%;

(d) Removing aqueous carboxylic acid from the resulting suspension until the cellulose is impregnated by an amount of aqueous carboxylic acid of from 1.5 to 4 times the dry weight of the cellulose;

(e) Displacing the remainder of the water from the resulting acid impregnated cellulose by means of at most 3 times the dry weight of the cellulose of the said lower carboxylic acid whereby cellulose impregnated with substantially anhydrous acid results together with aqueous lower carboxylic acid;

With the proviso that the suspension of the said water impregnated cellulose is effected with the entire amount of the aqueous lower carboxylic acid resulting from the said displacement operation and an amount of the aqueous lower carboxylic acid resulting from the said removal operation such that the total weight of aqueous lower carboxylic acid per unit of time used for the said suspension operation remains constant;

(f) Esterifying the acid cellulose impregnated with substantially anhydrous lower carboxylic acid resulting from the said displacement operation with a mixture of a lower carboxylic acid anhydride, an esterification catalyst and a solvent for the cellulose ester being manufactured; and (g) Stopping the esterification operation using remaining aqueous lower carboxylic acid resulting from the said removal operation, which acid has not been used for the said suspension operation.

It is also within the scope of the present invention to effect at least one of the process steps using a mixture of lower carboxylic acids.

The present invention also consists in a continuous process for the esterification of cellulose which comprises the following process steps:

(a) Defibering cellulose in 15 to 30 times its dry weight of water;

(b) Removing water from the defibered cellulose until it is impregnated by an amount of water of from 0.6 to 2.5 times the dry weight of the cellulose;

(c) Suspending the resulting water impregnated cellulose in 30 to 200 times its dry weight of aqueous lower carboxylic acid, said aqueous lower carboxylic acid being a solvent for the cellulose ester being manufactured and having a concentration of from 50 to 80%;

(d) Removing aqueous carboxylic acid from the resulting suspension until the cellulose is impregnated by an amount of aqueous carboxylic acid of from 1.5 to 4 times the dry weight of the cellulose;

(e) Displacing the remainder of the water from the resulting acid impregnated cellulose by means of at most 3 times the dry weight of the cellulose of the said lower carboxylic acid whereby cellulose impregnated with substantially anhydrous acid results together with aqueous lower carboxylic acid;

With the proviso that the suspension of the said water impregnated cellulose is effected with the entire amount of the aqueous lower carboxylic acid resulting from the said displacement operation and an amount of the aqueous lower carboxylic acid resulting from the said removal operation such that the total weight of aqueous lower carboxylic acid per unit of time used for the said suspension operation remains constant;

(f) Esterifying the said cellulose impregnated with substantially anhydrous lower carboxylic acid resulting from the said displacement operation with a mixture of a lower carboxylic acid anhydride, an esterification catalyst and a solvent for the cellulose ester being manufactured; and (g) Stopping the esterification operation and effecting hydrolysis of the ester resulting from the esterification operation using remaining aqueous lower carboxylic acid resulting from the removal operation, which remaining acid has not been used for the said suspension operation; it must be understood that the last mentioned process may be effected in such a way that at least one of the process steps is effected using a mixture of lower carboxylic acids.

Apart from using a mixture of lower carboxylic acids, the process of the present invention may be effected in such a way that a mixture of lower carboxylic acid anhydrides is used for the esterification operation.

The term "lower" as applied to carboxylic acid or acid anhydride means such materials containing 6 or less carbon atoms, e. g. acetic acid or acid anhydride, propionic acid or acid anhydride, butyric acid or acid anhydride, etc.

The accompanying schematic process diagram represents the various phases of the process in accordance with the invention.

At reference numeral 1 the cellulose is defibered by known means in the presence of an amount of water from 15–30 times the weight of the cellulose used. The resulting suspension may then be diluted further in order to facilitate its passage through tubes by the action of means known for this purpose, e. g. pumps, the action of gravity, a vacuum, etc. For example, it is possible to bring the cellulose content of the said suspension to a value of from 1 to 2% or even less.

The said suspension is then led to known apparatus indicated at reference numeral 2 where—by means of a continuous treatment such as filtering or filtering with suction—water is eliminated from said suspension until the cellulose is impregnated by an amount of water of from 0.6 to 2.5 times the dry weight of cellulose.

This water impregnated cellulose is led to apparatus indicated at reference numeral 3, for example, a tub provided with a stirrer into which tub there is led at an even rate of flow said water impregnated cellulose and 30 to 200 times the dry weight of the cellulose of an aqueous carboxylic acid (or mixture of aqueous carboxylic acids) which is a solvent for the cellulose ester being manufactured.

At reference numeral 4 most of the liquid is removed from the suspension coming from 3 by means of apparatus known for this purpose, e. g. a filtering device or a device for filtering with suction (for example, a rotatory vacuum filter). The apparatus is controlled in such a way that the cellulose issuing therefrom is impregnated by an amount of aqueous carboxylic acid (or mixture of carboxylic acids) comprised from 1.5 to four times its dry weight. Hereinafter, whenever the phrase "aqueous carboxylic acid" is used, it must be understood that said phrase includes a mixture of aqueous carboxylic acids. The use of the aqueous carboxylic acid resulting from this stage of the process will be described hereinafter.

The cellulose impregnated with aqueous carboxylic acid is then led to known apparatus indicated at reference numeral 5 where any water still present is substantially quantitatively eliminated by systematic displacement with an anhydrous carboxylic acid which is a solvent for the cellulose ester being manufactured.

The aqueous carboxylic acid resulting from the displacement described in the immediately preceding paragraph is led back to the apparatus at reference numeral 3 simultaneously with a portion of the aqueous carboxylic acid coming from the apparatus indicated at reference numeral 4, so that the total weight of aqueous carboxylic acid arriving at reference number 3 and used per unit of time for suspending the water impregnated cellulose is constant.

The cellulose impregnated with substantially anhydrous carboxylic acid coming from the apparatus at reference numeral 5 is then led to the stage indicated by reference numeral 6 where the actual esterification operation is effected in any known apparatus by means of a mixture of (i) one or more lower carboxylic acid anhydrides, (ii) a catalyst and (iii) a solvent for the ester being manufactured. This solvent may be wholly or partly a lower carboxylic acid or a mixture thereof, e. g. the acid of the anhydride used for the esterification.

After the esterification has been completed the solution of the resulting triester may be used in known manner for the manufacture of artificial threads. However, it is possible to precipitate the cellulose triester from its solution, to wash and dry it.

It is likewise possible to effect hydrolysis in order to bring the cellulose ester to the desired acid value, for example in order to confer upon it desirable solubility properties.

In order to stop the esterification and, if desired, to effect hydrolysis the remainder of the aqueous carboxylic acid coming from the apparatus indicated at reference numeral 4 is used which has not been employed for the suspension operation which is effected in the apparatus indicated at reference numeral 3.

By means of the process in accordance with the invention it is possible to reduce the amount of carboxylic acid which is required for the replacing of the entirety of the water of impregnation of the cellulose; it therefore follows that the cost of the entire process may be reduced.

Furthermore, the diminution of the amount of this acid enables also the reduction of the amount of impregnation water which is left in the cellulose, while at the same time there is obtained from the displacement operation an aqueous acid having a strength suitable for stopping the acetylation and for effecting hydrolysis. Thus the weight of aqueous acid produced in this way is diminished and therefore this acid may be reused in its entirety for stopping the acetylation, and, if desired, the hydrolysis operation. In this way considerable saving results as it is not necessary to effect recovery of excess dilute acid.

Naturally, the amount of water of impregnation left in the cellulose may be varied within the limits indicated, depending on whether a triester or a partially hydrolysed ester is required as the quantity of water must correspond to that quantity of water necessary for stopping the esterification operation and/or the hydrolysis operation.

The following examples are given by way of non-limitative example so that the invention can be better understood.

*Example 1*

"Acetate quality" wood pulp is defibered in known manner at the rate of 150 kg./hour (dry weight) in 20 times its weight of water and the resulting suspension is diluted so that its concentration is approximately 1%.

The above suspension is led into a known rotatory vacuum filter and the sheet of cellulose issuing therefrom is pressed between rollers of which the spacing is regulated so that the cellulose sheet contains 1.2 times of water based on the dry weight of cellulose.

The moist cellulose sheet is led into a known tub provided with a stirrer into which there is introduced at the same time and in continuous manner 7,500 kg./hour of aqueous acetic acid having an average concentration of 66% and of which the origin is indicated below.

The resulting suspension is led on to a known endless belt filter. The greater part of the aqueous acetic acid is eliminated in known manner on the first portion of this filter, while the water of impregnation still in the cellulose is eliminated on the second portion of the said filter as indicated hereinafter. At the point of issuance from the filter the cellulose impregnated with substantially anhydrous acetic acid is pressed between two suction rollers of which the pressure is regulatable and it is then led to an esterification apparatus.

The filter is regulated so as to eliminate at 7,230 kg./hour of dilute acetic acid. Of this acetic acid 6,700 kg./hour are led to the tub in which the suspension operation with aqueous acetic acid is effected and the remainder, corresponding to 530 kg./hour, is used for stopping the acetylation and the hydrolysis as indicated hereinafter.

On the second portion of the said filter the cellulose sheet is sprayed with glacial acetic acid at the rate of 500 kg./hour, while regulating the pressure of the rollers at the exit of the filter in such a way that the cellulose carries with it 150 kg./hour of acetic acid into known apparatus for effecting acetylation. The weight of glacial acetic acid used for the displacement is thus seen to be 500−150 kg./hour=350 kg./hour, i. e. 2.4 times the weight of dry cellulose used as starting material. This displacement with glacial acetic acid resulted in the production of 800 kg./hour of dilute acetic acid which is led back into the tub in which the suspension operation is effected.

Other than the acid impregnated cellulose, there are introduced continuously into the acetylation apparatus consecutively and at predetermined points the following:

450 kg./hour of glacial acetic acid,
345 kg./hour of acetic anhydride (98%),
50 kg./hour of acetic acid containing 7 kg. of sulphuric acid (96%).

The 530 kg./hour of dilute acid coming from the endless belt filter are introduced into the solution issuing from the last mentioned apparatus in continuous and regular fashion, and hydrolysis is effected for 8 hours at a temperature of 58° C.

After precipitation, washing and drying in known manner, there is obtained a cellulose acetate of which the acetyl value calculated as acetic acid amounts to 54.5%.

*Example 2*

Working is effected as in Example 1, but this time 150 kg./hour of a "nitration grade" wood pulp which has been strongly mercerised, is used and the pressure of the rollers at the exit of the rotatory vacuum filter is regulated in such a way that the cellulose sheet contains an amount of water corresponding to 0.62 times the dry weight of the wood pulp used.

The suspension operation in the tub provided with a stirrer is effected by using 9,800 kg./hour of aqueous acetic acid of which the concentration averages 70%.

The endless belt filter is regulated in such a way as to eliminate 9,440 kg./hour of aqueous acid; of this amount of aqueous acid 9,130 kg./hour are led to the tub used for the suspension operation and 310 kg./hour are used for stopping the esterification reaction.

The spraying on the second portion of the endless belt filter is effected with 360 kg./hour of glacial acetic acid and the pressure of the rollers at the exit of this filter is regulated so that the cellulose carries with it 140 kg./hour of acetic acid into the esterification apparatus. The weight of acid used for the displacement is thus seen to be 360—140 kg./hour=220 kg./hour, i. e. approximately 1½ times the weight of dry cellulose used as starting material. This displacement produces 670 kg./hour of aqueous acid which is led to the tub in which the suspension operation is effected.

Other than the acid impregnated cellulose, there are introduced into the esterification apparatus consecutively and at predetermined points the following:

460 kg./hour of 100% acetic acid,
340 kg./hour of acetic anhydride (98%),
50 kg./hour of 100% acetic acid containing 5.5 kg. of sulphuric acid (96%).

Into the solution issuing from the esterification apparatus there are incorporated in continuous and regular fashion, first of all 200 kg./hour of dilute acid coming from the endless belt filter to which have been added 6.5 kg. of magnesium acetate in order to neutralise the catalyst, then 110 kg. of the dilute acid which still remains and to which 1.5 kg. of magnesium carbonate have been added in order to eliminate the sulphuric acid. Thereupon precipitation is effected in continuous manner and there thus results a cellulose triacetate of excellent quality of which the acetyl value calculated as acetic acid amounts to 61.6%.

*Example 3*

Working is effected as in Example 1, but using 150 kg./hour (dry weight) of linters, the pressure of the rollers at the exit of the rotatory vacuum filter being regulated so that the moist sheet of linters contains an amount of water corresponding to 0.66 times the weight of the dry linters used as starting material.

The suspension operation in the tub provided with a stirrer is effected by using 7,500 kg./hour of a mixture of aqueous acetic acid and aqueous propionic acid of which the average total acid concentration is 71%.

The endless belt filter is regulated so that 7,150 kg./hour of the mixture of aqueous acids is eliminated; 6,800 kg./hour of this aqueous acid mixture are led to the tub in which suspension is effected and 350 kg./hour are used for stopping the esterification process and effecting hydrolysis.

The spraying on the second portion of the endless belt filter is effected with 400 kg./hour of a mixture of one part by weight of acetic acid and three parts by weight of propionic acid. The pressure of the rollers at the exit of this filter is regulated so that the linters carry with them 150 kg./hour of the mixture of anhydrous acids into the esterification apparatus. The weight of the mixture of anhydrous acids used for the displacement is thus seen to be 400—150 kg./hour=250 kg./hour, i. e. approximately 1.7 times the weight of dry linters used. This displacement produces 700 kg./hour of a mixture of the aqueous acids which is led to the tub in which suspension is effected.

Other than the acid impregnated cellulose, there are introduced into the esterification apparatus in sequence and at predetermined points the following:

550 kg./hour of propionic acid containing 3 kg. of perchloric acid (60%),
385 kg./hour of acetic anhydride (98%),
55 kg./hour of acetic acid containing 3 kg. of sulphuric acid (96%).

The solution issuing from the esterification apparatus has incorporated therein in regular and continuous manner the 350 kg./hour of the mixture of aqueous acids coming from the endless belt filter and hydrolysis is effected at a temperature of 48° C. until the required acetyl and propionyl value calculated as acetic and propionic acid is obtained.

After precipitation, washing and drying, there is obtained a cellulose aceto-propionate which gives, in normal solvents, clear solutions of which the filtrability is excellent.

*Example 4*

Working is effected as in Example 1, but 150 kg./hour (dry weight) of sulphite quality wood pulp (standard type for viscose) are used and the pressure of the rollers at the exit of the rotatory vacuum filter is regulated so that the moist cellulose sheet contains an amount of water corresponding to 0.8 times the dry weight of the cellulose used.

The suspension operation in the tub provided with a stirrer is effected with 7,500 kg./hour of aqueous acetic acid of which the average concentration is 71%.

The endless belt filter is regulated so that 7,170 kg./hour of aqueous acetic acid are eliminated; of this amount 6,750 kg./hour are led into the tub in which suspension is effected and 420 kg./hour are used for stopping the esterification reaction and effecting hydrolysis.

The spraying on the second portion of the endless belt filter is effected with 450 kg./hour of glacial acetic acid and the pressure of the rollers at the exit of this filter is regulated so that the cellulose carries with it 150 kg./hour of this acid into the esterification apparatus. The weight of acetic acid used for the displacement is thus seen to be 450—150 kg./hour=300 kg./hour, i. e. twice the weight of the dry cellulose used as starting material.

This displacement produces 750 kg./hour of aqueous acid which is led into the tub in which suspension is effected.

Other than the acid impregnated cellulose, there are introduced into the esterification apparatus in sequence and at predetermined points the following:

50 kg./hour of acetic acid containing 4.5 kg. of sulphuric acid (96%), and
600 kg./hour of methylene chloride;

then a mixture of:

200 kg./hour of acetic anhydride (98%), and
320 kg./hour of butyric acid anhydride (96%).

To the solution issuing from the esterification apparatus there are added in regular and continuous manner the 420 kg./hour of dilute acetic acid coming from the endless belt filter to which there has been added 1.5 kg./hour of sulphuric acid (96%) and hydrolysis is effected for 8½ hours at a temperature of 45° C.

After precipitation and washing there results an acetobutyrate of cellulose of which the acetyl-butyryl value calculated as acetic and butyric acid amounts to approximately 44% of acetic acid and 15% of butyric acid; the filtrability of this material is excellent.

Although the present invention has been described with particular reference to specific details, it is not intended that such details shall be regarded as limitations upon the scope of the invention except insofar as included in the accompanying claims.

We claim:

1. A continuous process for the esterification of cellulose which comprises the following process steps: defibering cellulose in 15 to 30 times its dry weight of water; removing water from the defibered cellulose until it is impregnated by an amount of water of from 0.6 to 2.5 times the dry weight of the cellulose; suspending the resulting water impregnated cellulose in 30 to 200 times its dry weight of aqueous lower carboxylic acid, said aqueous lower carboxylic acid being a solvent for the cellulose ester being manufactured and having a concentration of from 50 to 80%; removing aqueous carboxylic acid from the resulting suspension until the cellulose is impregnated by an amount of aqueous carboxylic acid of from 1.5 to 4 times the dry weight of the cellulose; displacing the remainder of the water from the resulting acid impregnated cellulose by means of at most 3 times the dry weight of the cellulose of the said lower carboxylic acid whereby cellulose impregnated with substantially anhydrous acid results together with aqueous lower carboxylic acid; with the proviso that the suspension of the said water impregnated cellulose is effected with the entire amount of the aqueous lower carboxylic acid resulting from the said displacement operation and an amount of the aqueous lower carboxylic acid resulting from the said removal operation such that the total weight of aqueous lower carboxylic acid per unit of time used for the said suspension operation remains constant; esterifying the said cellulose impregnated with substantially anhydrous lower carboxylic acid resulting from the said displacement operation with a mixture of a lower carboxylic acid anhydride, an esterification catalyst and a solvent for the cellulose ester being manufactured; and stopping the esterification operation using remaining aqueous lower carboxylic acid resulting from the said removal operation, which acid has not been used for the said suspension operation.

2. A process according to claim 1, in which at least one of the process steps is effected using a mixture of lower carboxylic acids.

3. A continuous process for the esterification of cellulose which comprises the following process steps: defibering cellulose in 15 to 30 times its dry weight of water; removing water from the defibered cellulose until it is impregnated by an amount of water of from 0.6 to 2.5 times the dry weight of the cellulose; suspending the resulting water impregnated cellulose in 30 to 200 times its dry weight of aqueous lower carboxylic acid, said aqueous lower carboxylic acid being a solvent for the cellulose ester being manufactured and having a concentration of from 50 to 80%; removing aqueous carboxylic acid from the resulting suspension until the cellulose is impregnated by an amount of aqueous carboxylic acid of from 1.5 to 4 times the dry weight of the cellulose; displacing the remainder of the water from the resulting acid impregnated cellulose by means of at most 3 times the dry weight of the cellulose of the said lower carboxylic acid whereby cellulose impregnated with substantially anhydrous acid results together with aqueous lower carboxylic acid; with the proviso that the suspension of the said water impregnated cellulose is effected with the entire amount of the aqueous lower carboxylic acid resulting from the said displacement operation and an amount of the aqueous lower carboxylic acid resulting from the said removal operation such that the total weight of aqueous lower carboxylic acid per unit of time used for the said suspension operation remains constant; esterifying the said cellulose impregnated with substantially anhydrous lower carboxylic acid resulting from the said displacement operation with a mixture of a lower carboxylic acid anhydride, an esterification catalyst and a solvent for the cellulose ester being manufactured; and stopping the esterification operation and effecting hydrolysis of the ester resulting from the esterification operation using remaining aqueous lower carboxylic acid resulting from the said removal operation, which remaining acid has not been used for the said suspension operation.

4. Process according to claim 3, in which at least one of the process steps is effected using a mixture of lower carboxylic acids.

5. A process according to claim 1, in which a mixture of lower carboxylic acid anhydrides is used for the esterification operation.

6. A process according to claim 3, in which a mixture of lower carboxylic acid anhydrides is used in effecting the esterification operation.

References Cited in the file of this patent

UNITED STATES PATENTS

| | | |
|---|---|---|
| 2,315,973 | Malm | Apr. 6, 1943 |
| 2,432,153 | Haney | Dec. 9, 1947 |
| 2,487,892 | Richter et al. | Nov. 15, 1949 |
| 2,490,754 | Hincke et al. | Dec. 6, 1949 |
| 2,603,638 | Seymour et al. | July 15, 1952 |
| 2,778,820 | Clevy et al. | Jan. 22, 1957 |

FOREIGN PATENTS

| | | |
|---|---|---|
| 644,465 | Great Britain | Aug. 31, 1949 |